United States Patent
Hong et al.

(10) Patent No.: US 9,137,748 B2
(45) Date of Patent: Sep. 15, 2015

(54) CONNECTION CLOSE PACKET TRANSMISSION METHOD AND APPARATUS

(71) Applicant: Samsung Electronics Co., Ltd., Gyeonggi-do (KR)

(72) Inventors: Youngki Hong, Seoul (KR); Killyeon Kim, Gyeonggi-do (KR); Yongseok Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 100 days.

(21) Appl. No.: 13/757,232

(22) Filed: Feb. 1, 2013

(65) Prior Publication Data

US 2013/0201889 A1    Aug. 8, 2013

(30) Foreign Application Priority Data

Feb. 3, 2012    (KR) .................... 10-2012-0011241

(51) Int. Cl.
*H04W 52/02*    (2009.01)
(52) U.S. Cl.
CPC .......... *H04W 52/02* (2013.01); *H04W 52/0209* (2013.01); *Y02B 60/50* (2013.01)
(58) Field of Classification Search
None
See application file for complete search history.

(56) References Cited

U.S. PATENT DOCUMENTS

| | | | |
|---|---|---|---|
| 6,834,306 B1* | 12/2004 | Tsimelzon ................. | 709/228 |
| 8,520,694 B1* | 8/2013 | Bali ........................... | 370/428 |
| 2003/0037158 A1* | 2/2003 | Yano et al. ................. | 709/232 |
| 2004/0177148 A1* | 9/2004 | Tsimelzon, Jr. ............ | 709/227 |
| 2007/0008884 A1* | 1/2007 | Tang ........................... | 370/230 |
| 2008/0130642 A1* | 6/2008 | Kim et al. .................. | 370/389 |
| 2010/0189231 A1* | 7/2010 | LaFreniere et al. ........ | 379/93.01 |
| 2010/0323742 A1* | 12/2010 | Allen et al. ................ | 455/519 |
| 2012/0099501 A1* | 4/2012 | Babin ........................ | 370/311 |

* cited by examiner

*Primary Examiner* — Chi H Pham
*Assistant Examiner* — Shick Hom
(74) *Attorney, Agent, or Firm* — The Farrell Law Firm, P.C.

(57) ABSTRACT

A connection close-related packet transmission method and apparatus is provided for improving power saving efficiency of a power-constrained mobile terminal. The connection close-related packet transmission method includes establishing a radio connection with a server; determining whether a preconfigured connection close timeout elapses without connection activity after the connection establishment; buffering, when the connection close timeout elapses, a connection close-related packet; and transmitting, when another packet transmission is predicted, the connection-related packet to the server. The connection close-related packet transmission method and apparatus is advantageous in power saving efficiency of a power-constrained mobile terminal.

17 Claims, 9 Drawing Sheets

CONNECTION CLOSE PACKET TRANSMISSION METHOD AND APPARATUS

PRIORITY

This application claims priority under 35 U.S.C. §119(a) to a Korean patent application filed on Feb. 3, 2012 in the Korean Intellectual Property Office and assigned Serial No. 10-2012-0011241, the contents of which are incorporated herein by reference.

BACKGROUND OF THE INVENTION

1. Field of the Invention

The present invention generally relates to a communication system and, more particularly, to a connection close-related packet transmission method and apparatus for improving power saving efficiency of a power-constrained mobile terminal in the communication system.

2. Description of the Related Art

Typically, a mobile device using wireless communication networks is capable of supporting Transmission Control Protocol (TCP) for data transfer applications such as a web browser.

In Hypertext Transfer Protocol (HTTP)/1.0, if the request/response exchange ends between a client and a server, the TCP connection for exchanging the request/response is closed. However, HTTP/1.1 supports HTTP persistent connection. In HTTP/1.1, if data transfer is further required after the initial request/response exchange, it is possible to exchange the request/response to continue data transfer in the same TCP before the connection close timeout preconfigured for connection closes. This means that the 3-way handshake process for establishing/releasing a TCP connection is omitted so as to improve HTTP performance. The 3-way handshake is performed in the order of SYN→SYN+ACK→ACK. A detailed description thereof is made later with reference to FIG. 1.

Recent mobile devices such as Android smartphones mostly support HTTP/1.1 to improve the loading speed of a webpage. When transmitting and receiving data for web browsing through the HTTP persistent connection by means of a power-constrained mobile device, it is possible to reduce the time consuming process of TCP connection setup/release, resulting in improvement of mobile device performance. The HTTP server may transmit a message including an explicit parameter "connection: close" in the header such that the client starts releasing the connection. However, the explicit parameter is likely to be excluded by taking notice of the HTTP persistent connection characteristics.

FIG. 1 is a message flow diagram illustrating the conventional TCP connection establishment and release procedure.

A terminal 100 sends a Synchronization (SYN) packet to a first server 102 at step 110. The first server 102 sends a SYN Acknowledgement (SYN+ACK) packet to the terminal 100 in response to the SYN packet at step 115. The terminal 100 sends an ACK packet to the first server 102 in response to the SYN+ACK packet at step 120. Thus, the 3-way handshaking consists of steps 110 to 120. If the 3-way handshaking has been completed, a connection is established between the terminal 100 and the first server 102 at step 125. Afterward, the terminal 100 and the first server 102 communicate data at step 130. The connection activity ends at step 135. The connection activity is the activity of exchanging data through the connection established at step 125.

Afterward, the terminal 100 monitors to detect the connection activity before the expiry of a connection close timeout 190 and sends, if no connection activity is detected before the expiry of the connection close timeout 190, a Finish (FIN) packet to the first server 102 at step 140. The first server sends an ACK packet to the terminal 100 in response to the FIN packet at step 145.

Afterward, the terminal 100 may perform the 3-way handshaking with a second server 104 through steps 150, 155, and 160. As a result, the terminal 100 and the second server 104 establish a connection at step 165.

When the message includes no "connection: close", the client monitors to check the connection activity before the expiry of the connection close timeout set for the HTTP connection close. If the connection close timeout expires without connection activity, the FIN/ACK packets act as the control messages for releasing the TCP connection, and are exchanged at steps 140 and 145. In the meantime, the radio communication module in charge of transmitting/receiving data enters a power saving mode after an inactivity timeout. In the conventional method, the radio communication module stays in an active state unnecessary until the control message (FIN/ACK) exchange for release of the TCP connection is completed after the expiry of the connection close timeout, resulting in an unnecessary waste of battery power.

FIG. 2 is a graph illustrating packet transmission amount in loading an Internet webpage in the conventional method. In the graph of FIG. 2, the horizontal axis denotes time, and the vertical axis denotes number of packets.

FIG. 2 shows that the FIN packet occurs at 5 to 10 seconds after the last data transmission/reception as denoted by reference number 210. If the radio communication module enters the power saving mode without transmitting the FIN packets, it is possible to reduce the unnecessary power consumption.

SUMMARY OF THE INVENTION

The present invention has been made in an effort to address the above problems and disadvantages and to provide at least the advantages described below. Accordingly, an aspect of the present invention is to provide a connection close-related packet transmission apparatus and method that is capable of conserving power of a mobile device.

In accordance with an aspect of the present invention, a connection close-related packet transmission method of a terminal includes establishing a radio connection with a server; determining whether a preconfigured connection close timeout elapses without connection activity after the connection establishment; buffering, when the connection close timeout elapses, a connection close-related packet; and transmitting, when another packet transmission is predicted, the connection-related packet to the server.

In accordance with another aspect of the present invention, a connection close-related packet transmission apparatus for mobile communication includes a radio communication unit which establishes a radio connection with a server; a connection close timer which determines whether a preconfigured connection close timeout elapses without connection activity after the connection establishment; and a control unit which controls to buffer, when the connection close timeout elapses, a connection close-related packet, wherein the radio communication unit transmits, when another packet transmission is predicted, the connection-related packet to the server.

BRIEF DESCRIPTION OF THE DRAWINGS

The features and advantages of the invention will become more apparent from the following detailed description viewed in conjunction with the accompanying drawings, in which.

DETAILED DESCRIPTION OF EMBODIMENTS OF THE PRESENT INVENTION

Figure 1:
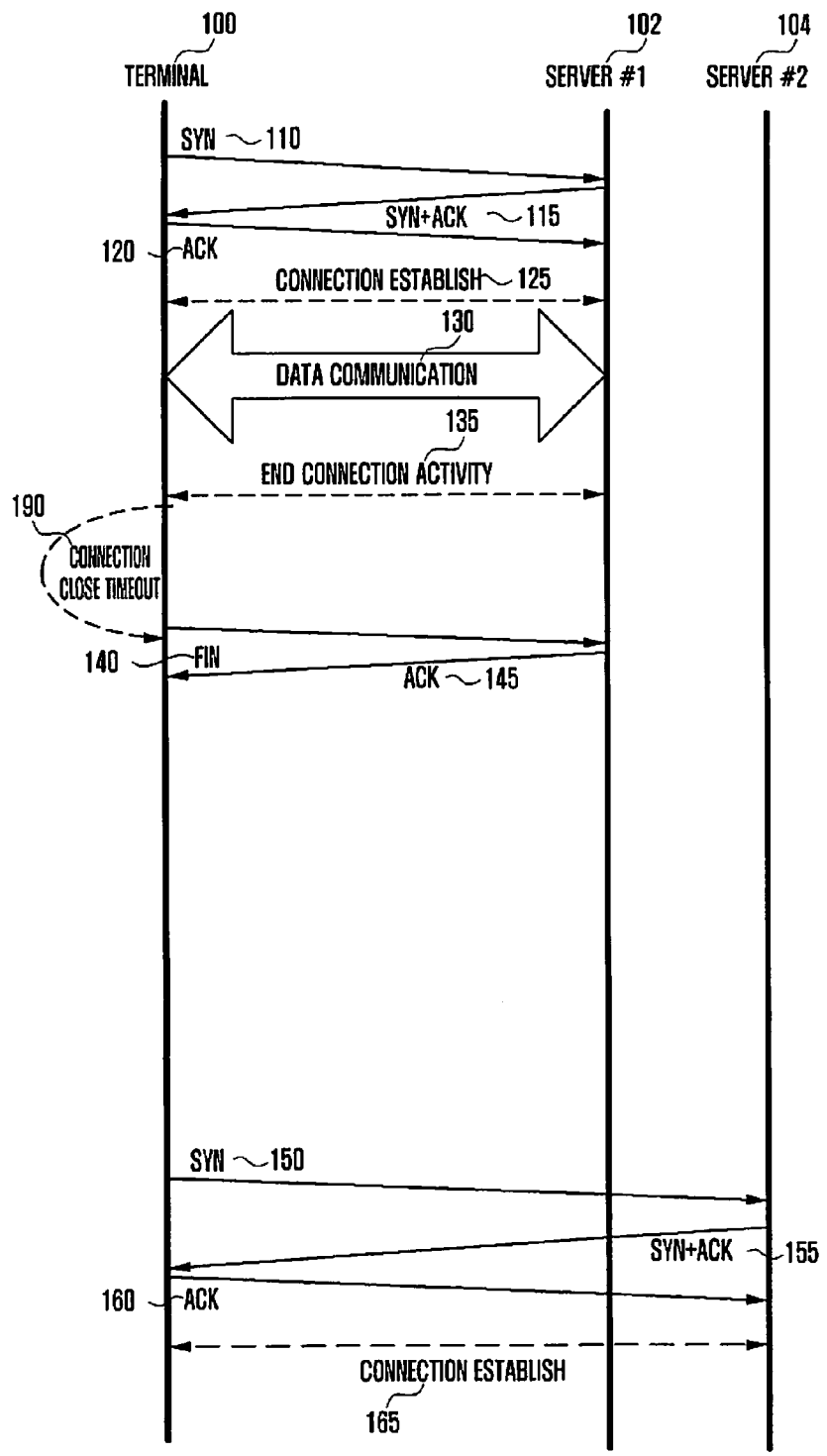
FIG. 1 is a message flow diagram illustrating the conventional TCP connection establishment and release procedure.
Figure 2:
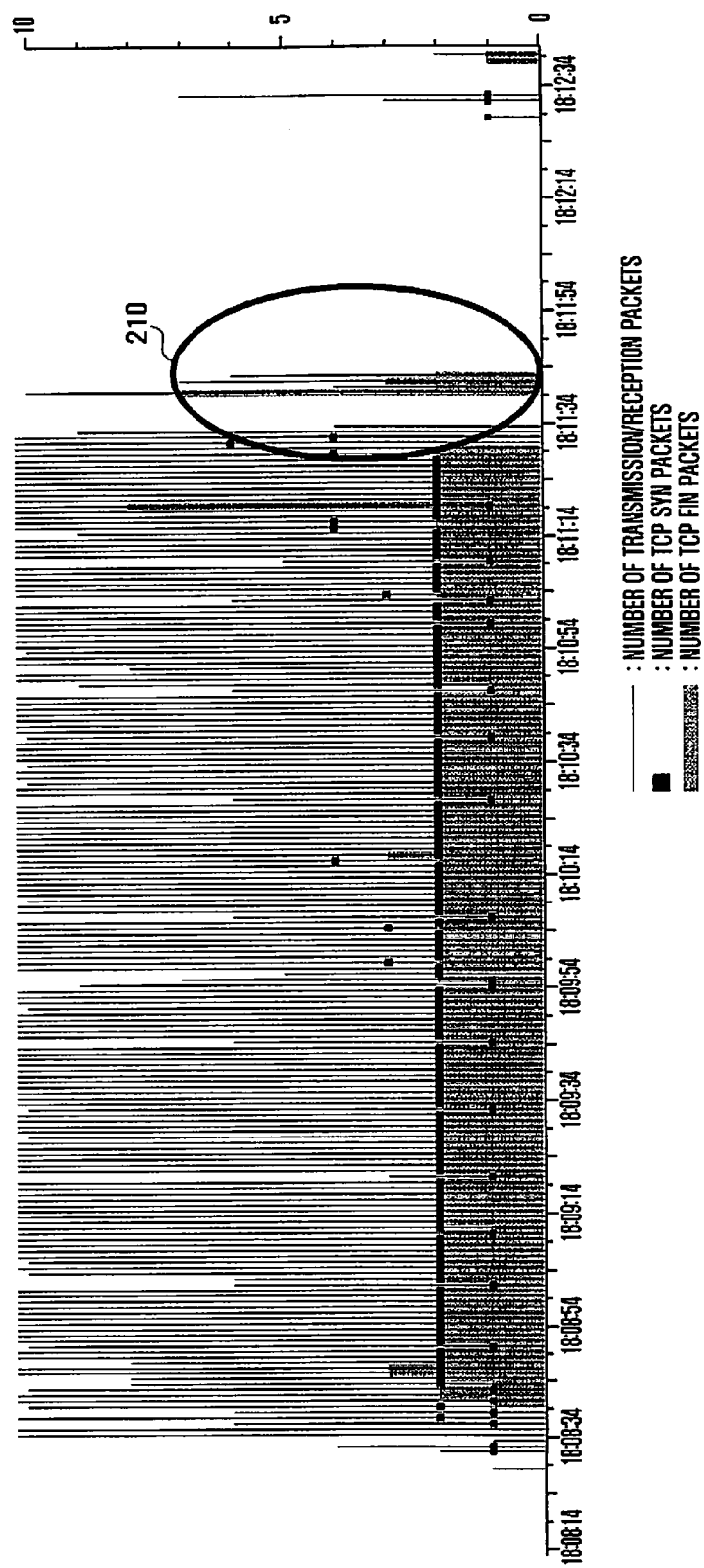
FIG. 2 is a graph illustrating packet transmission amount in loading an Internet webpage in the conventional method.

Embodiments of the present invention are described with reference to the accompanying drawings in detail. Detailed descriptions of well-known functions and structures incorporated herein may be omitted to avoid obscuring the subject matter of the present invention. That is, the description is made only with the operations necessary in the embodiments of the present invention, and other parts that may cause obscurity of the subject matter of the present invention are omitted.

In addition, some elements may be exaggerated, omitted or simplified in the drawings, and the elements may have sizes and/or shapes different from those shown in drawings, in practice. The same reference numbers are used throughout the drawings to refer to the same or like parts.

Figure 3A:
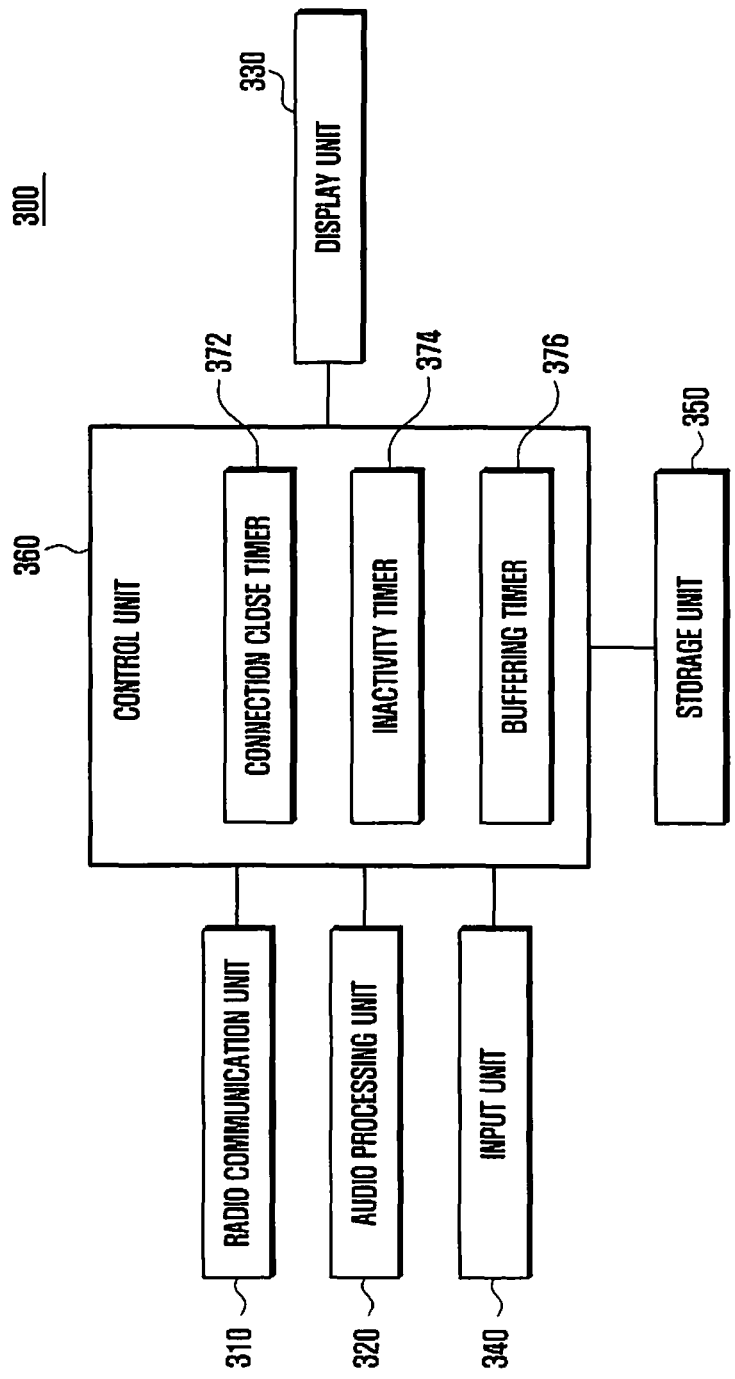
FIG. 3A is a block diagram illustrating the configuration of a TCP communication terminal according to an embodiment of the present invention.

FIG. 3A is a block diagram illustrating the configuration of a TCP communication terminal according to an embodiment of the present invention.

Referring to FIG. 3A, the TCP communication terminal 300 according to an embodiment of the present invention includes a control unit 360, a radio communication unit 310, an audio processing unit 320, an input unit 340, a display unit 330, and a storage unit 350.

The radio communication unit 310 is responsible for processing radio signals carrying data to be transmitted and received to and from the TCP communication terminal 300. The radio communication unit 310 includes a Radio Frequency (RF) transmitter for up-converting and amplifying a signal to be transmitted and an RF receiver for low noise amplifying and down-converting the received signal. The radio communication unit 310 receives the data through a radio channel and delivers the data to the control unit 360 and transmits the data output by the control unit 360 through the radio channel. The radio communication unit 310 powers on and off under the control of the control unit 360.

The audio processing unit 320 is provided with a codec pack which includes a data codec for processing packet data and an audio codec for processing audio signal including voice. The audio processing unit 320 converts a digital audio signal to an analog audio signal by means of the audio codec to output an audible sound wave through a speaker (SPK) and converts the analog audio signal input through a microphone (MIC) to a digital signal by means of the audio codec. According to an embodiment of the present invention, the TCP communication terminal 300 may be implemented without the audio processing unit 320. The audio processing unit 320 is not an essential component of the TCP communication terminal 300.

The input unit 340 receives a user input and generates a corresponding input signal to the control unit 360. The input unit 340 can be implemented with a touch sensor and/or a key input means.

The touch sensor can be implemented with any of a capacitive overlay sensor, a resistive overlay sensor, an infrared beam sensor, and a pressure sensor. The touch sensor is also capable of being implemented with at least one of the all the types of sensing devices capable of sensing physical contact or pressure. The touch sensor senses a user's touch gesture and generates a corresponding touch signal to the control unit 360. The touch signal includes coordinates at the touch point. If the user moves the touch, the touch sensor generates the touch signal including the coordinates of the points on the moving path to the control unit 360.

The key input means receives the key input made by key manipulation of the user and generates a corresponding input signal to the control unit 360. The key input means can be a keypad including a plurality of alphanumeric keys and navigation keys and arranged on a side of the TPC communication terminal 300 in the form of function keys. When the TCP communication terminal 300 is implemented with a touch sensor capable of manipulating all functions, the key input means may be omitted.

The display unit 330 can be implemented with any of a Liquid Crystal Display (LCD), Organic Light Emitting Diodes (OLED), and Active Matrix OLED (AMOLED). The display unit 330 displays the menus of the TCP communication terminal 300, input data, function settings information, and other various informations to the user. The display unit 330 also displays a booting screen, idle mode screen, menu screen, call progress screen, and various application execution screens.

According to an embodiment of the present invention, the display unit 330 and the input unit 340 can be omitted.

The storage unit 350 stores the programs and data associated with the operations of the TCP communication terminal 300. The storage unit 350 can be provided with a program region and a data region. the program region stores a program for controlling the overall operations of the TCP communication terminal 300, an Operating System (OS) for booting the TCP communication terminal 300, and application programs for playing multimedia contents and executing supplementary functions of the TCP communication terminal 300, such as a camera function, an audio playback function, and a still and motion picture display function. The data region stores the data generated by the TCP communication terminal 300 such as still and motion pictures, phonebook, and audio data.

The control unit 360 controls the overall operations of the function blocks of the TCP communication terminal. The control unit 360 controls the power supply to the radio communication unit 310 according to the operation mode. The control unit 360 controls the radio communication unit 310 to transmit/receive and buffer the packets.

The control unit 360 also includes a connection close timer 372, an inactivity timer 374, and a buffering timer 376. According to an embodiment of the present invention, the connection close timer 372, the inactivity timer 374, and the buffering timer 376 can be implemented outside the control unit 360. According to another embodiment of the present invention, the buffering timer 376 can be omitted. When the buffering timer 376 is omitted, the FIN packet transmission triggered by the buffering timeout is not performed. The TCP communication terminal 300 may also include a FIN buffer counter instead of the buffering timer 376. In this case, the FIN buffer counter is used to determine whether the number of buffered FIN packets is greater than a predetermined threshold value and, if so, to send the buffered FIN packets under the control of the control unit 360.

The connection close timer 372 is used to detect the expiry of connection close timeout without any packet connection activity in a specific TCP connection. If a predetermined connection close timeout expires without any packet transmission activity, the control unit 360 buffers the FIN packets for releasing the TCP connection in the storage unit 350.

The inactivity timer 374 is used to detect the expiry of a predetermined inactivity timeout without activity of the radio communication unit 310. If a predetermined inactivity timeout expires without activity of the radio communication unit 310, the control unit 360 turns off the power to the radio communication unit 310.

The buffering timer 376 is used to detect the expiry of a predetermined buffering timeout without transmission of the buffered FIN packets. If a predetermined buffering timeout expires without transmission of the buffered FIN packets, the control unit 360 turns on the radio communication unit 310 to transmit the buffered FIN packets.

The detailed operations of the control unit 360 and its components and the radio communication unit 310 are described later with reference to FIGS. 4 to 8.

Figure 3B:
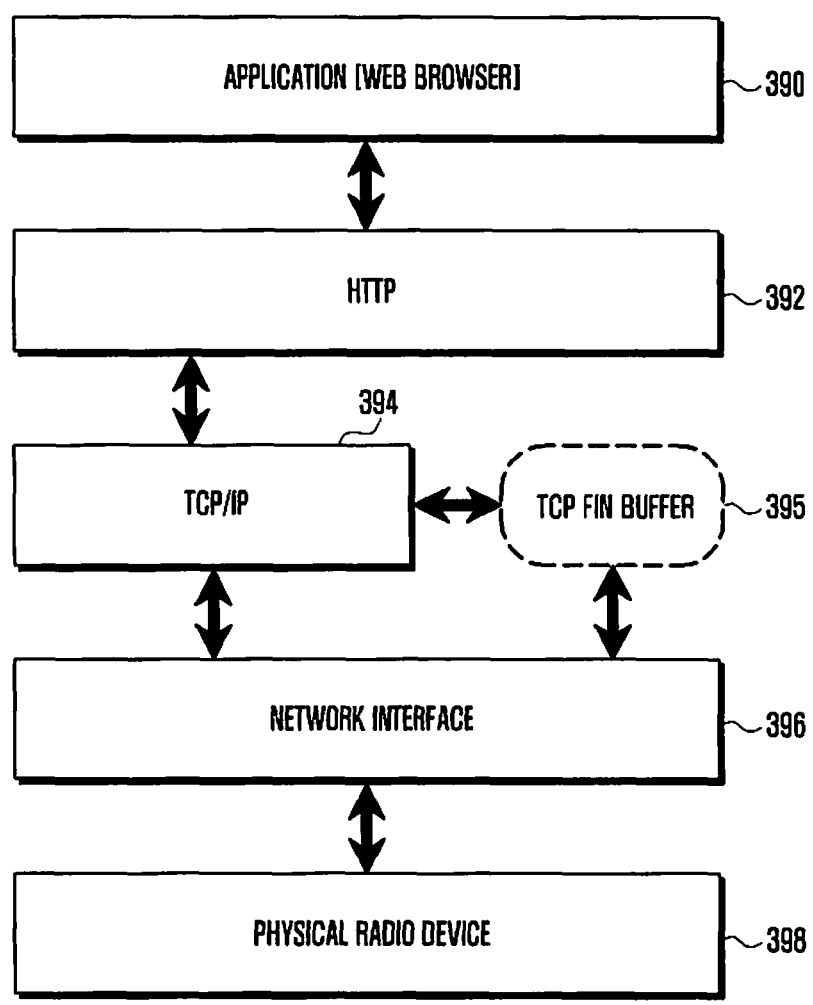
FIG. 3B is a diagram illustrating the protocol layer architecture of a TCP communication terminal 300 according to an embodiment of the present invention.

FIG. 3B is a diagram illustrating the protocol layer architecture of a TCP communication terminal 300 according to an embodiment of the present invention.

The protocol layer architecture of the TCP communication terminal includes an application layer 390, an HTTP layer 392, a TCP/IP layer 394, a network interface layer 396, and a physical Radio Device layer 398. The TCP communication terminal 300 conserves power by buffering the FIN packets transmitted for releasing a TCP connection in the TCP FIN buffer 395.

Figure 4:
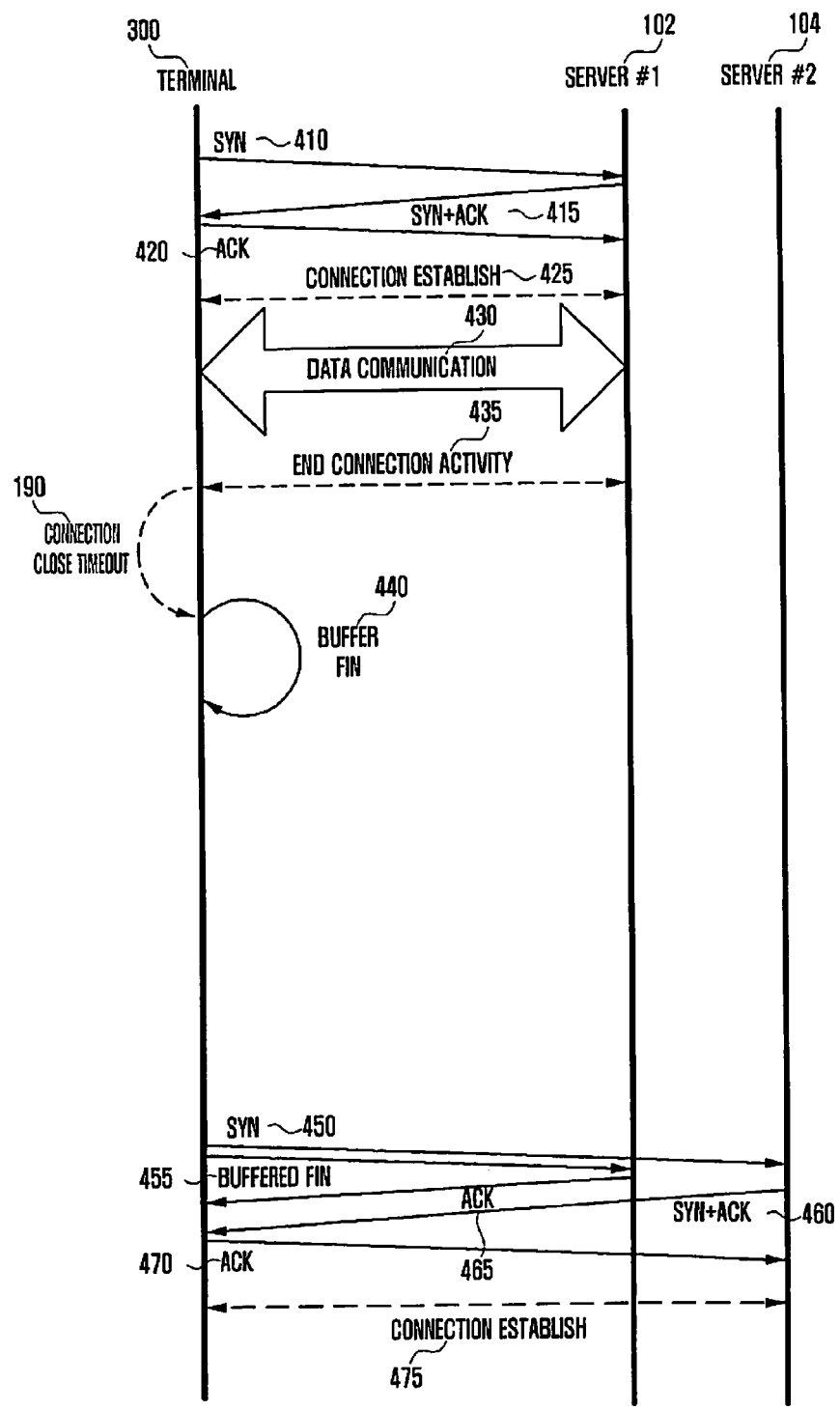
FIG. 4 is a signal flow diagram illustrating the TCP communication procedure according to an embodiment of the present invention.

FIG. 4 is a signal flow diagram illustrating the TCP communication procedure according to an embodiment of the present invention.

The TCP communication terminal 300 performs 3-way handshaking with the first server 102 through steps 410 to 420. As a consequence, the TCP communication terminal 300 and the first server 102 establish a connection at step 425. Afterward, the TCP communication terminal 300 and the first server 102 communicate data through the connection at step 430. The connection activity between the TCP communication terminal 300 and the first server 102 ends at step 435.

Then, if the connection close timeout 190 elapses, the connection close timer 372 detects the expiration of the connection close timeout 190. The control unit 360 generates a FIN packet which is buffered in the TCP FIN buffer 395. The connection close timeout 190 can be set by the terminal manufacturer or according to the specification of the HTTP/TCP standards.

Unlike the conventional method in which the FIN packet is transmitted immediately at the expiration of the connection close timeout 190, the TCP communication terminal 300 according to an embodiment of the present invention buffers the FIN packet at step 440 to delay the transmission of the FIN packet until another packet transmission is predicted.

Afterward, the TCP communication terminal 300 sends an SYN packet to the second server 104 to initiate 3-way handshaking at step 450. If transmission of another packet is predicted, i.e. SYN packet, the control unit 360 sends the buffered FIN packet to the first server 102 at step 455. The FIN packet can be sent before or after the SYN packet transmission. This can be applied when transmission is predicted for a control packet other than SYN packet or data packet. Afterward, the TCP communication terminal 300 and the second server 104 establish a connection through steps 460, 470 and 475. Separately, the TCP communication terminal 300 receives an ACK packet corresponding to the FIN packet from the first server 102 at step 465 and releases the TCP connection with the first server 102.

According to the procedure of FIG. 4, the TCP communication terminal 300 is capable of moving up the power-off timing of the radio communication unit 310 as compared to the case of transmitting the FIN/ACK immediately. Also, if it is necessary to power on the radio communication unit 310 for SYN packet transmission, the TCP communication terminal 300 sends the FIN packet along with the SYN packet so as to reduce the power loss.

Figure 5:
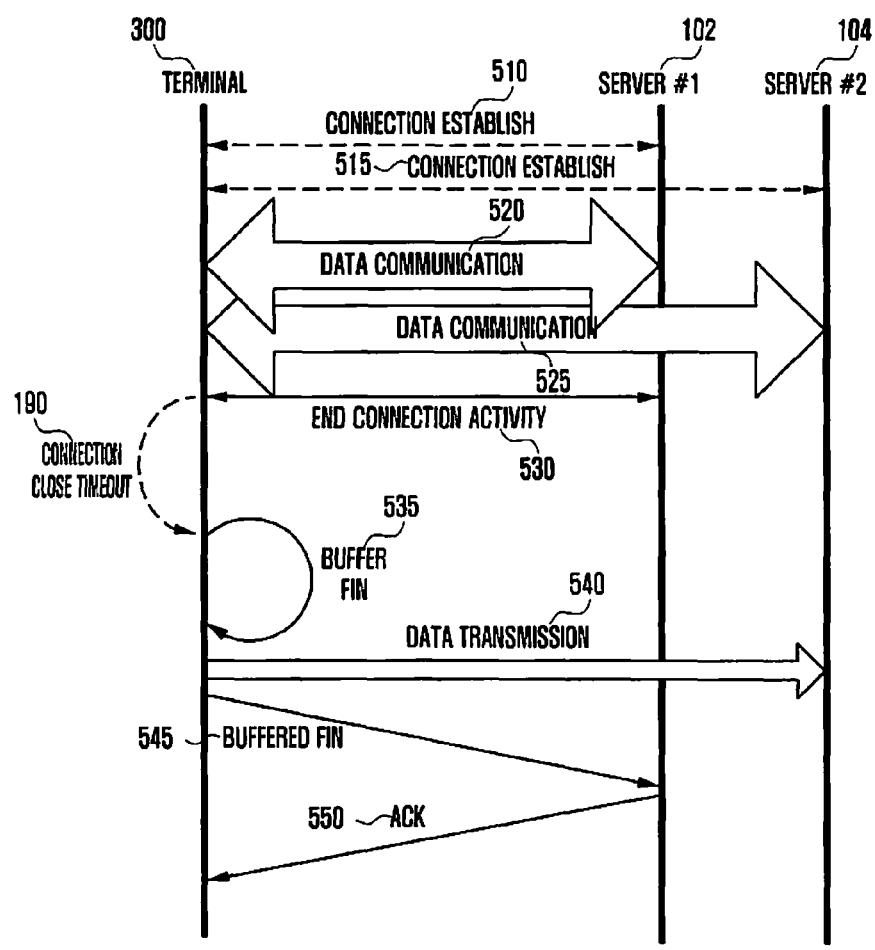
FIG. 5 is a signal flow diagram illustrating a TCP communication procedure according to an embodiment of the present invention.

FIG. 5 is a signal flow diagram illustrating a TCP communication procedure according to an embodiment of the present invention.

The TCP communication terminal 300 establishes a TCP connection with the first server 102 at step 510. The TCP communication terminal 300 also establishes another TCP connection with the second server 104 at step 515. The TCP communication terminal 300 and the first server 102 communicate data at step 520. The TCP communication terminal 300 and the second server 104 communicate data at step 525.

Afterward, the connection activity between the TCP communication terminal 300 and the first server 102 ends at step 530. Then, if the connection close timeout 190 elapses without connection activity, the connection close timer 372 detects the expiration of the connection close timer 190. If the connection close timeout 190 expires without connection activity, the control unit 360 buffers the Fin packet at step 535. The connection close timeout 190 can be set by the terminal manufacturer or according to the specification of HTTP/TCP standard.

Unlike the conventional method in which the FIN packet is transmitted immediately upon expiration of the connection close timeout 190, the TCP communication terminal 300 delays the FIN packet transmission until another packet transmission starts.

Afterward, the TCP communication terminal 300 sends the data packet to the second server 104 at step 540. If transmission of a data packet, i.e. another packet, is predicted, the control unit 360 sends the buffered FIN packet to the first server 102 at step 545. The FIN packet can be transmitted before and after the data packet transmission timing. The TCP communication terminal 300 receives the ACK packet corresponding to the FIN packet from the first server 102 at step 550 and releases the TCP connection with the first server 102.

According to the procedure of FIG. 5, the TCP communication terminal 300 is capable of moving up the power-off timing of the radio communication unit 310 as compared to the case of transmitting the FIN/ACK immediately. Also, if it is necessary to power on the radio communication unit 310 for SYN packet transmission, the TCP communication terminal 300 sends the FIN packet along with the SYN packet so as to reduce the power loss.

Figure 6:
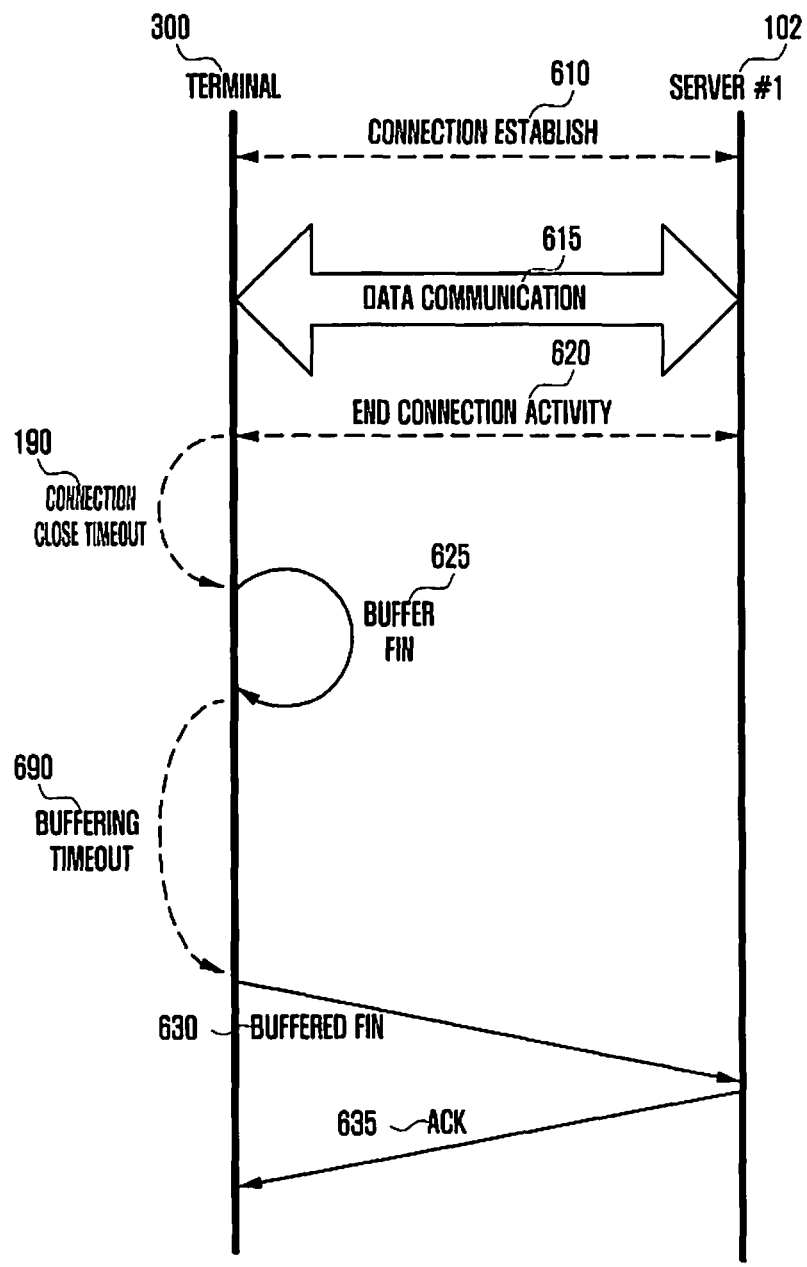
FIG. 6 is a signal flow diagram illustrating a TCP communication procedure according to an embodiment of the present invention.

FIG. 6 is a signal flow diagram illustrating a TCP communication procedure according to an embodiment of the present invention.

The TCP communication terminal 300 establishes a TCP connection with the first server 102 at step 610. The TCP communication terminal 300 and the first server 102 communicate data at step 615.

Afterward, the connection activity between the TCP communication terminal 300 and the first server 102 ends at step 620. Then, if the connection close timeout 190 elapses without connection activity, the connection close timer 372 detects the expiration of the connection close timeout 190. If the connection close timeout 190 expires without any connection activity, the control unit 360 buffers the FIN packet at step 625. The connection close timeout 190 can be set by the terminal manufacturer or according to the specification of HTTP/TCP standard.

If no FIN packet is transmitted during the predetermined buffering timeout 690 after the FIN packet is buffered, the buffering timer 376 detects the expiration of the buffering timeout 690. If the FIN packet is not transmitted after the Fin packet is buffered, the control unit 360 controls the radio communication unit 310 to transmit the buffered FIN packet to the first server 102 at step 630. The TCP communication terminal 300 receives the ACK packet corresponding to the FIN packet from the first server 102 at step 635 and releases the TCP connection with the first server 102.

The procedure of FIG. 6 is performed to prevent the FIN packet transmission from being delayed excessively.

According to a modified example of the embodiment of FIG. 6, if the number of buffered FIN packets becomes greater than a threshold value, the radio communication unit 310 transmits the buffered FIN packets to the respective destinations immediately. That is, when multiple TCP connections are established and the connection activity ends on the TCP connections, the FIN packets for the TCP connections are buffered until the number of FIN packets reaches the threshold number, and then the control unit 360 transmits all buffered FIN packet immediately when the number of buffered FIN packet exceeds the threshold value. According to this modified embodiment, it is possible to prevent the excessive FIN packets from being buffered or causing overflow.

Figure 7:
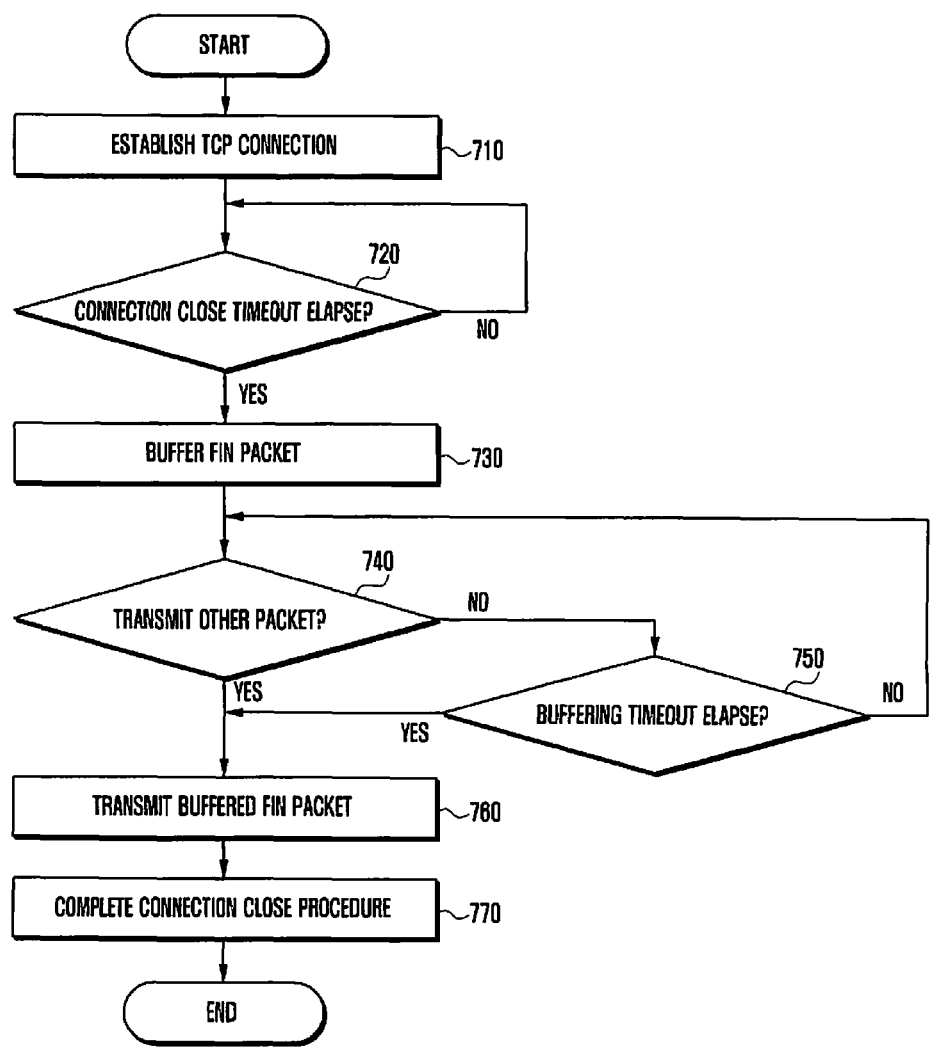
FIG. 7 is a flowchart illustrating the TCP FIN transmission procedure according to an embodiment of the present invention.

FIG. 7 is a flowchart illustrating the TCP FIN transmission procedure according to an embodiment of the present invention.

Referring to FIG. 7, the TCP communication terminal 300 establishes a TCP connection with a server, e.g. the first server 102, at step 710. Once the TCP connection has been established, the connection close timer 372 determines whether a predetermined connection close timeout 190 has expired without any connection activity on the corresponding TCP connection at step 720. If the predetermined connection close timeout 190 has expired without any connection activity, the connection close timer 372 detects the expiration of the connection close timeout 190 and notifies the control unit 360 of the connection close timeout expiration, and the procedure goes to step 730. Until the connection close timeout 190 expires without connection activity or the TCP connection is released due to some other reason, the connection close timer 372 monitors the connection close timeout 190 to determine if it expires.

The control unit 360 buffers the FIN packet issued for releasing the corresponding TCP connection at step 730. Next, the control unit 360 determines whether there is an other packet queued to be transmitted (or whether it is necessary to transmit other packets) at step 740. For example, if transmission of an SYN packet is predicted as shown in FIG. 4, or a data packet as shown in FIG. 5, or if it becomes necessary to transmit such a packet, the radio communication unit 310 transmits the buffered FIN packet at step 760. If no other packet transmission is predicted, the procedure goes to step 750.

At step 750, the buffering timer 376 determines whether a predetermined buffering timeout 690 expires without transmission of the buffered FIN packet at step 750. If the buffering timeout 690 expires without transmission of the buffered FIN packets, the radio communication unit 310 transmits the buffered FIN packets at step 760. If the number of buffered FIN packet is greater than or equal to 2, the buffering timeout expiration is determined in association with the first buffered FIN packet and, if the buffering timeout 690 has expired, the radio communication unit 310 transmits all buffered FIN packets. If the buffering timeout 690 has not expired, steps 740 and 750 are repeated periodically or non-periodically until the necessity of other packet transmission is detected or the buffering timeout expires.

In the modified embodiment, if the number of the buffered FIN packets is greater than a predetermined threshold value, the radio communication unit 310 transmits the buffered FIN packets. A step of determining the number of FIN packets may replace the buffering timeout expiration determination step 750. The step of determining the number of FIN packets can be applied along with the buffering timeout expiration determination step 750. According to another modified embodiment, both the FIN packet number determination step and the buffering timeout expiry determination step 750 can be omitted.

When the buffering timeout expiration determination step is used, it is possible to prevent the FIN packet transmission from being delayed excessively. When the FIN packet number determination step is used, it is possible to prevent excessive number of FIN packets from being buffered. When such effects are not intended, both the FIN packet number determination step and buffering timeout expiration determination step can be omitted.

The radio communication unit 310 transmits the buffered FIN packets at step 760. Finally, the radio communication unit 310 ends the connection close procedure at step 770. The connection close procedure may include steps of receiving ACK packet corresponding to the FIN packet, closing the TCP connection, and other supplementary steps.

Figure 8:
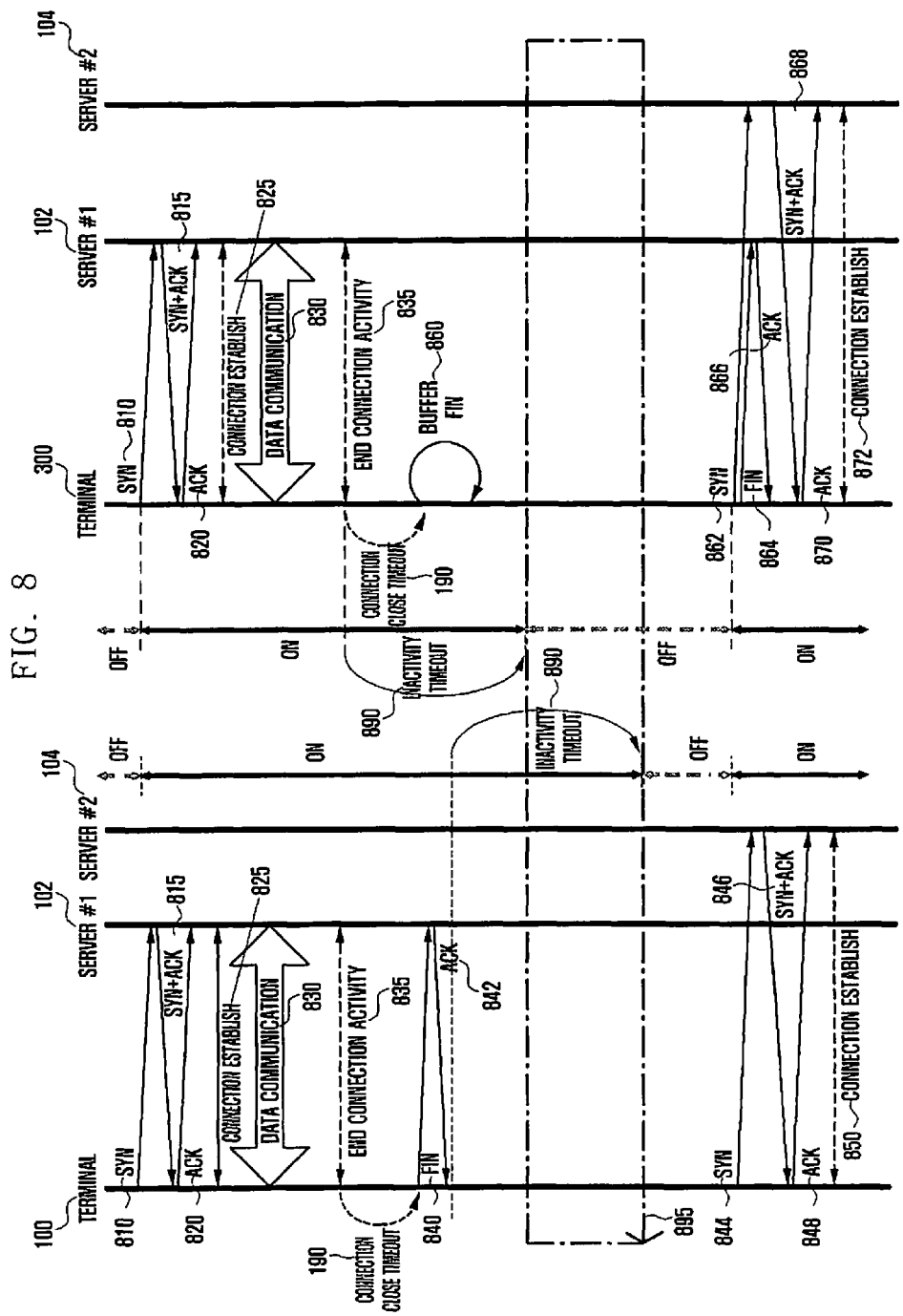
FIG. 8 is a diagram illustrating the conventional TCP communication procedure and the TCP communication procedure according to an embodiment of the present invention in a comparative manner.

FIG. 8 is a diagram illustrating a comparison between the conventional TCP communication procedure and the TCP communication procedure according to an embodiment of the present invention.

The left part of FIG. 8 shows the TCP communication procedure of the conventional TCP communication terminal, and the right part of FIG. 8 shows the TCP communication procedure of the TCP communication terminal according to an embodiment of the present invention.

Since steps 810 to 835 are common in both the conventional and proposed TCP communication procedures, a detailed description of each is not made at this time.

Before step 810, the radio communication unit 310 is in the power-off state. The terminal 100 (or 300) performs 3-way handshaking with the first server 102 according to a user input or a preconfigured operation execution through steps 810 and 820. The control unit 360 powers on the radio communication unit 310 to transmit the SYN packet at step 810. Next, the terminal 100 (or 300) establishes a TCP connection with the first server 102 at step 825. Afterward, the terminal 100 (or 300) communicates data with the first server 102. The connection activity on the corresponding TCP connection link ends at step 835. For example, this is the case when the user ends web surfing or an application download is completed.

If the connection close timeout 190 elapses after the end of the connection activity at step 835, the conventional TCP communication terminal 100 sends the FIN packet to the first server 102 at step 840. The conventional TCP communication terminal 100 receives the ACK packet in response to the FIN packet at step 842. Until the inactivity timeout 890 elapses after the receipt of the ACK packet, the radio communication unit 310 of the terminal 100 stays in the power-on state. If no packet is transmitted or received by the radio communication unit for the preconfigured inactivity timeout 890 starting upon the receipt of the ACK packet, the conventional TCP communication terminal 100 powers off the radio communication unit 310.

Afterward, the conventional TCP communication terminal 100 establishes a connection with the second server 104 at step 850 through 3-way handshaking. The terminal 100 powers on the radio communication unit 310 to transmit the SYN packet at step 844.

In this conventional method, the conventional TCP communication terminal 100 powers off the radio communication unit for the duration from the timing when the inactivity timeout 890 starting upon receipt of the ACK expires at step 840 to the SYN packet transmission timing at step 844.

In the method according to an embodiment of the present invention, however, if the connection close timeout 190 expires without connection activity on the corresponding TCP connection after the end of the connection activity at step 835, the terminal 300 buffers the FIN packet at step 860. Next, if the inactivity timeout 890 expires without radio communication through the radio communication unit 310 after the end of the connection activity at step 835, the control unit 360 powers off the radio communication unit 310. This means that the TCP communication terminal 300 powers off the radio communication unit 310 earlier than the conventional TCP communication terminal 100 by a certain time duration. The radio communication unit power-off time difference between the conventional and the methods of the present invention is equal to the time calculated by summing the connection close timeout 190 and the time taken for transmitting the FIN packet transmission to the first server 102 and receiving the ACK corresponding to the FIN packet from the first server 102.

Afterward, the terminal 300 establishes a connection with the second server 104 through 3-way handshaking at steps 862, 868, 870, and 872 according to the user input. If a SYN packet transmission is predicted, the control unit 360 sends the buffered FIN packet to the first server 102 before or after the SYN packet transmission at step 862. The TCP communication terminal 300 receives the ACK packet from the first server 102 at step 864 and thus the TCP connection between the terminal 300 and the first server 102 is released.

In order to perform the above described procedure, the buffering timeout 690 of FIG. 6 is set to a value greater than the inactivity timeout 890, or no buffering timeout 690 is set.

As shown in the comparison of FIG. 8, the TCP communication terminal 300 and method of the present invention are capable of reducing power consumption of the radio communication unit 310.

The embodiments of FIGS. 4 to 8 are directed to the TCP FIN packet buffering. In the case of HTTP Secure (HTTPS) communication, a Secure Sockets Layer/Transport Layer Security (SSL/TLS) close_notify alert message or other connection close-related packets are transmitted before the TCP FIN packet transmission. That is, for the connection established using HTTPS, it is required to buffer the close_notify alert message as well as the TCP FIN packet. According to RFC (Request for Comments) 5246 standard, the close_notify alert message is replaced by enumeration type constant 0 (enum(0)).

Although the above description is directed to the case where the TCP FIN and close_notify alert messages are the packets indicating the session releases, the present invention can be applied to other types of packets related to connection release (session release). That is, if the connection close timeout elapses without connection activity after the connection establishment, the session release-related packet transmission is delayed as described in the embodiments of FIGS. 4 to 8.

As described above, the connection close-related packet transmission method and apparatus of the present invention is capable of improving power saving efficiency of a power-constrained mobile terminal.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowcharts and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowcharts and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, refers to, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the present invention may occur to persons skilled in the art, the present invention should be construed to include everything within the scope of the appended claims and equivalents thereof.

Although certain embodiments of the present invention have been described in detail hereinabove with specific terminology, this is for the purpose of describing particular embodiments only and not intended to be limiting of the present invention. While particular embodiments of the present invention have been illustrated and described, it would be obvious to those skilled in the art that various other changes and modifications can be made without departing from the spirit and scope of the present invention.

What is claimed is:

1. A connection close-related packet transmission method of a terminal, the method comprising:
    establishing a connection with a server;
    determining whether a preconfigured connection close timeout elapses after establishing the connection;
    buffering, when the preconfigured connection close timeout elapses, a connection close-related packet generated in response to a release of a transmission control protocol (TCP) connection;
    transmitting, when a preconfigured buffering timeout elapses without transmission of the connection close-related packet after buffering the connection close-related packet, the buffered connection close-related packet to the server; and
    transmitting, when a next packet transmission is predicted, the buffered connection close-related packet to the server.

2. The method of claim 1, wherein the next packet is a data packet.

3. The method of claim 1, wherein the terminal comprises a radio communication unit for performing radio communication.

4. The method of claim 3, further comprising turning off, when a preconfigured inactivity timeout elapses without data communication through the radio communication unit, power to the radio communication unit.

5. The method of claim 4, wherein the preconfigured inactivity timeout is set to a value less than the preconfigured buffering timeout.

6. The method of claim 1, further comprising transmitting, when a number of buffered connection close-related packets is greater than a predetermined threshold value, the buffered connection close-related packets to the server.

7. The method of claim 1, wherein the connection is the TCP connection, and the connection close-related packet is TCP Finish (FIN) packet.

8. The method of claim 7, wherein transmitting the buffered connection close-related packet comprises transmitting, when a TCP Synchronization (SYN) packet transmission is required for a new connection, the buffered FIN packet.

9. The method of claim 1, wherein establishing the connection comprises establishing one of Transport Layer Security (TLS) connection and Security Socket Layer (SSL) connection with the server, and the connection close-related packet is a close notify alert message packet.

10. A connection close-related packet transmission apparatus for mobile communication, the apparatus comprising:
    a radio communication unit which establishes a connection with a server;
    a connection close timer which determines whether a preconfigured connection close timeout elapses after the connection establishment; and
    a control unit which controls to buffer, when the preconfigured connection close timeout elapses, a connection close-related packet generated in response to a release of a transmission control protocol (TCP) connection,
    wherein the radio communication unit transmits, when a preconfigured buffering timeout elapses without transmission of the connection close-related packet after buffering the connection close-related packet, the buffered connection close-related packet to the server, and transmits, when a next packet transmission is predicted, the buffered connection close-related packet to the server.

11. The apparatus of claim 10, wherein the next packet is a data packet.

12. The apparatus of claim 10, wherein the control unit turns off, when a preconfigured inactivity timeout elapses without data communication through the radio communication unit, power to the radio communication unit.

13. The apparatus of claim 12, wherein the preconfigured inactivity timeout is set to a value less than the preconfigured buffering timeout.

14. The apparatus of claim 10, wherein the radio communication unit transmits, when a number of buffered connection close-related packets is greater than a predetermined threshold value, the buffered connection close-related packets to the server.

15. The apparatus of claim 10, wherein the connection is the TCP connection, and the connection close-related packet is TCP Finish (FIN) packet.

16. The apparatus of claim 15, wherein the radio communication unit transmits, when a TCP Synchronization (SYN) packet transmission is required for a new connection, the buffered FIN packet.

17. The apparatus of claim 10, wherein the radio communication unit establishes one of Transport Layer Security (TLS) connection and Security Socket Layer (SSL) connection with the server, and the connection close-related packet is a close notify alert message packet.

* * * * *